US007038975B2

(12) United States Patent
Ferri et al.

(10) Patent No.: US 7,038,975 B2
(45) Date of Patent: May 2, 2006

(54) LUMINOUS HANDS AND DISPLAY DEVICE INCLUDING THE SAME, PARTICULARLY IN A TIMEPIECE

(75) Inventors: Yvan Ferri, Lausanne (CH); Jean-Jacques Born, Morges (CH); René Viennet, Neuchâtel (CH); Joseph Ricchiuto, Gorgier (CH)

(73) Assignee: Asulab S.A., Marin (CH)

( * ) Notice: Subject to any disclaimer, the term of this patent is extended or adjusted under 35 U.S.C. 154(b) by 325 days.

(21) Appl. No.: 10/314,134

(22) Filed: Dec. 9, 2002

(65) Prior Publication Data

US 2003/0112712 A1 Jun. 19, 2003

(30) Foreign Application Priority Data

Dec. 13, 2001 (CH) .................................... 2281/01

(51) Int. Cl.
*G04B 19/30* (2006.01)
*G04B 19/06* (2006.01)
*G01D 11/28* (2006.01)
*G01D 13/22* (2006.01)

(52) U.S. Cl. ........................ 368/67; 368/227; 368/228; 368/238; 116/288; 116/328; 363/23; 363/26

(58) Field of Classification Search .................. 368/67, 368/223, 227–228, 238; 116/284–288; 362/23–30
See application file for complete search history.

(56) References Cited

U.S. PATENT DOCUMENTS 2,290,278 A * 7/1942 Failla ......................... 368/234
2,831,453 A * 4/1958 Hardesty .................... 116/288
4,274,358 A * 6/1981 Nakamura et al. .......... 116/288
4,380,043 A * 4/1983 Takamatsu et al. ........... 362/26
4,625,262 A * 11/1986 Sakakibara et al. ........... 362/26
4,860,170 A * 8/1989 Sakakibara et al. ........... 362/26
4,959,759 A * 9/1990 Kohler ....................... 362/489
5,142,456 A * 8/1992 Murphy ....................... 362/26
5,199,376 A * 4/1993 Pasco ......................... 116/332
6,025,820 A * 2/2000 Salmon et al. ............. 345/75.1
6,182,601 B1 * 2/2001 Baatz ......................... 116/288
6,379,015 B1 * 4/2002 Wilhelm et al. .............. 362/23

FOREIGN PATENT DOCUMENTS

DE 837 070 6/1952
FR 732 788 9/1932

* cited by examiner

*Primary Examiner*—Vit W. Miska
(74) *Attorney, Agent, or Firm*—Sughrue Mion, PLLC

(57) ABSTRACT

There is provided a type of luminous hand including a part made of moulded transparent material that forms a circular head (28, 35) and a body (28, 34) of a hand. In order to direct a portion of a light beam parallel to the axis (15) of the hand towards the interior of the body, the head includes a plurality of reflectors (40, 41) distributed around the axis and formed by dihedron shaped hollows. This improves the intensity and uniformity of the light in the hand body. Inclined light-diffusing surfaces, covered with a light coloured paint, are arranged on the bottom face of the hand. In a display device with several coaxial hands (11,12) such as that of a watch, the reflectors of the superposed heads (29, 35) of the hands are located at respective distances from the axis which are different from one hand to another, such that they never completely cover each other. The light source preferably includes three light-emitting diodes (23) located under the dial (10). A cylindrical light guide (18) is placed between the source and the heads of the hands, in the central opening in the dial.

18 Claims, 2 Drawing Sheets

LUMINOUS HANDS AND DISPLAY DEVICE INCLUDING THE SAME, PARTICULARLY IN A TIMEPIECE

BACKGROUND OF THE INVENTION

The present invention concerns a hand or pointer comprising a part made of transparent material and capable of being illuminated so that the hand becomes luminous and visible even in the dark, in particular in an analogue display device such as a timepiece.

The invention also concerns an analogue display device for a timepiece, including such hands. The invention further concerns a watch including such a display device.

Currently, it is common to use a hand made of transparent coloured material which is illuminated internally so that it appears to be luminous, in particular to facilitate night reading of an analogue indicator such as the speedometer of an automobile. One can find for example in Patent publications Nos. WO 96/02810, U.S. Pat. No. 5,546,888 and DE 38 17 874, the description of devices in which a light beam, produced by a fixed source, axially penetrates a transparent rotating hub of the single hand and reaches a reflection surface which distributes the light into the elongated body of the hand. In order for the body of the hand to appear sufficiently and uniformly luminous, incorporating a fluorescent substance therein is known. However, the electric power consumption of these devices has limited their applications to date.

The idea of internally illuminating the hands of a timepiece for the same purpose is already an old one, but cannot be put into practice in the same way as in the aforementioned devices, particularly because of the coaxial arrangement of the hour, minute and possibly second hands, and the superposition of the circular heads of the hands. In order to reach the head of the top hand, the axial light beam has to pass through the head of each underlying hand, where the light flux has to be both divided and directed, on the one hand, towards the body of the hand, and on the other hand towards the overlying hand. Further, since the zone of the rotational axis is generally occupied by an opaque shaft, the light cannot pass into this zone, unless a transparent shaft is used. This thus results in particular difficulties for distributing the light.

In Swiss Patent No. 160 797 published in 1933, each of the two hands of a large clock is made in the form of a hollow housing with a light coloured or transparent bottom and a matt translucent cover. A group of three fixed lamps distributed around coaxial shafts for the hands produces an axial light beam which penetrates the head of each hand from the back, where a mirror distributes light towards the assembly of the bottom of the housing. The mirror of one of the hands is shifted in a radial direction with respect to the mirror of the other to avoid putting it in shadow. Thus, most of the light emitted by the lamps is lost because it passes to the side of the mirrors. Moreover, a construction of this kind with hollow hands is evidently too voluminous to be able to be applied to a watch.

Moreover, it has been proposed to illuminate the hands of a timepiece by means of electro-luminescent elements fixed to the transparent or translucent body of each hand (see for example U.S. Pat. No. 5,623,456). This system has the drawback of requiring rotating electric contacts which take a lot of space and are unreliable in the long term.

In the drawings of Japanese Patent No. 55-60894, one can see a timepiece with two coaxial luminous hands made of transparent material and having light-diffusing surfaces. The superposed circular heads of these hands are illuminated by an axial beam from a fixed source, opposite which the head of the hour hand has an annular groove with a semi-circular transverse profile. Above this groove, the top face of the head includes an annular raised portion provided with a light-diffusing surface for transmitting light towards a similar annular groove of the head of the minute hand. However, this construction has not had any commercial success, probably because of unsatisfactory light distribution in the hands.

SUMMARY OF THE INVENTION

In order to allow an analogue display by means of luminous hands in portable apparatuses where the available electric power is very limited, as in watches, there is thus a need for a device capable of assuring sufficient illumination of at least at part of each hand from one or more low power fixed light sources. In particular, with respect to the prior art, it is sought to increase the luminous output, i.e. the part of the light emitted by the source which is effectively reflected by the hands towards an observer. An additional object consists in arranging a hand made of transparent material so as to illuminate more particularly certain parts of the body of the hand, so that its position is clearly visible to the observer even if there is little power available to illuminate the hand.

Therefore, according to a first aspect, the present invention concerns a hand for an analogue display device, particularly in a timepiece, including a part made of transparent material which forms a body and a head of the hand, said head being centred with respect to a rotational axis of the hand and arranged to receive a light flux on its bottom face and to distribute at least a part of the flux into the transparent material, characterised in that the head of the hand includes a plurality of reflectors distributed in said head and arranged to reflect a part of said light flux towards the body of the hand.

According to another aspect of the invention, there is provided a display device with luminous hands for a timepiece, including: a dial; coaxial hands disposed above the dial and each including a part made of transparent material which forms a head and body of a hand, the respective heads of the hands being superposed and fixed to respective shafts to rotate about a common rotational axis; and a stationary light source arranged to illuminate the set of hand heads from below by means of a light flux substantially parallel to the rotational axis; the device being characterised in that at least two of the hands are made in accordance with the first aspect of the invention. Preferably, in each hand individually considered, the reflectors are located at substantially the same distance from the rotational axis, but this distance is different from one hand to another to prevent a reflector of a lower hand entirely masking a reflector of the overlying hand.

Owing to these arrangements, the reflectors can advantageously be distributed in the head of the hand not only in proximity to the body of the hand, but also in the parts of the head located at a distance from the body. Intercepting a part of the axial light flux in this way on different regions of the contour of the hand head offers several advantages. The reflectors can have a larger total surface area and thus intercept more light than a reflector disposed opposite the body of the hand as provided by Patent document No. WO 96/02810. When the light source is formed by two or more elements of small size, spaced out from each other around the rotational axis, suitable distribution of the reflectors provides a reflected light intensity which varies less, during the rotation of the hand, than with a single reflector located facing the body. Further, certain of the reflectors can advantageously be oriented differently, which allows the light to be directed in a preferred manner towards certain regions of the hand, either to illuminate such regions more particularly, or to obtain sufficiently uniform distribution of the light taking account of the shape of the hand.

BRIEF DESCRIPTION OF THE DRAWINGS

Other features and advantages of the present invention will appear from the description of a preferred embodiment, given hereinafter by way of non-limiting example with reference to the annexed drawings, in which:

FIG. 1 shows schematically the external contour of the case of a wristwatch 1 provided with a time display device including in particular, a dial 10, an hour hand 11 and a minute hand 12, these hands being fixed to respective coaxial shafts 13 and 14 driven by a watch movement that is not shown, so as to rotate about their common axis 15. Dial 10 is placed on a dial support 16 and these two elements include a central aperture 17 in which is fixed a light guide 18 formed by the wall of a cylindrical tube made of transparent material, which extends around shafts 13 and 14. Below support 16, there is a printed circuit board 20 carrying a light source 21 facing bottom face 22 of light guide 18, for producing a light beam essentially axially directed, i.e. parallel to axis 15, which is led in this direction by guide 18. In the present example, light source 21 is formed by a plurality of light-emitting diodes (LED) 23 which are distributed around shafts and mounted on printed circuit board 20 in accordance with the SMD technique. Diodes 23 are preferably three in number and are uniformly distributed around the axis, in this case at 120° from each other. They are all illuminated at the same time, for example owing to a control circuit mounted on board 20 and activated by means of a manual member such as a push button of the watch.

DETAILED DESCRIPTION OF THE INVENTION

The watch movement can be of any type. If it is electronic, it can be mounted either on the bottom face of printed circuit board 20, or on another board located underneath.

Hands 11 and 12 are intended to be illuminated internally by light source 21, to facilitate reading the time and particular to make this possible in the dark. There is no illumination of the dial in the example shown here, but this can be provided, as will be explained hereinafter.

Figure 2:
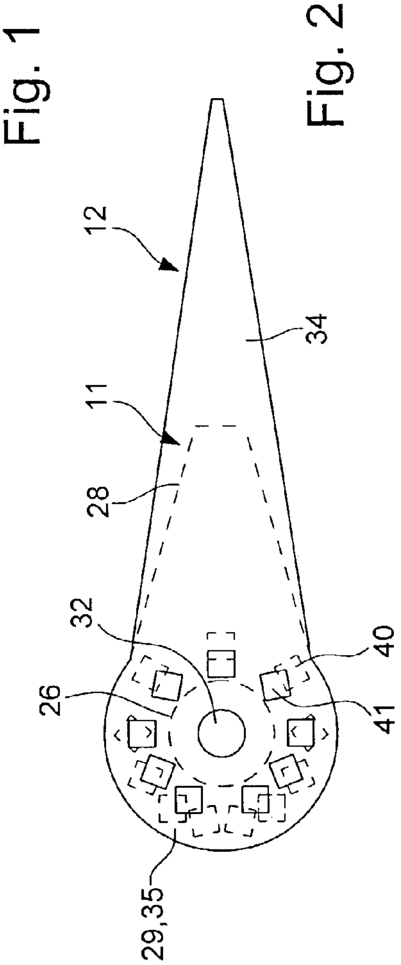
FIG. 2 is a top view of the hour and minute hands shown in FIG. 1.
Figure 3:
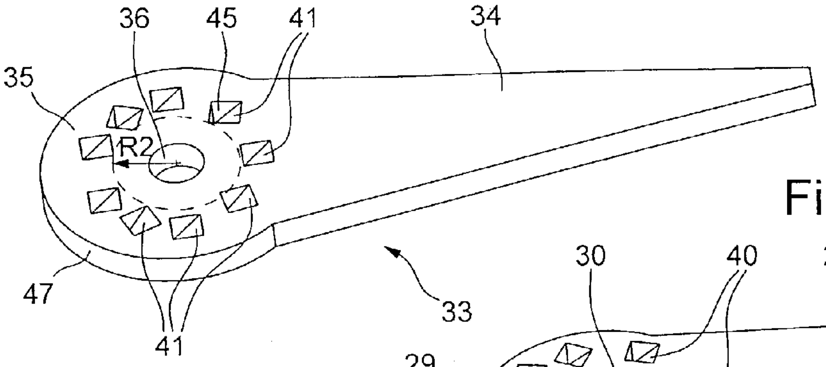
FIG. 3 is a perspective view of the minute hand.
Figure 4:
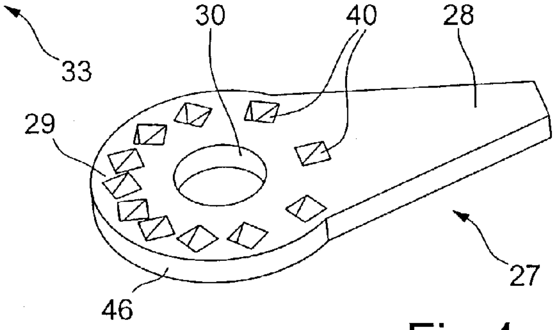
FIG. 4 is a perspective view of the hour hand.

In FIG. 2, hour hand 11 is shown in dotted lines because it is masked by minute hand 12. In FIGS. 3 to 6, the central bush of each hand has been omitted in order to show only the transparent part of the hand.

Hour hand 11 includes a central metal bush 26 and a part 27 (FIG. 4) made of transparent material that forms an elongated body 28 and a circular head 29 of the hand, head 29 having a central hole 30 in which bush 26 is fixed. Part 27 may advantageously be a moulded synthetic part, for example made of PMMA, manufactured by overmoulding on the metal bush. The latter is fixed onto the corresponding shaft 14 in the usual manner. Body 28 of the hand preferably has a triangular or trapezoidal shape in plane, but other shapes are possible depending upon requirements.

Minute hand 12, disposed in a conventional manner above hour hand 11, also includes a central metal bush 32 and a part 33 made of transparent material (FIG. 3) including an elongated body 34 and a circular head 35 provided with a central hole 36 where bush 32 is fixed. This transparent part 33 can be made in the same way as part 27 of the other hand, with a head of the same size but a longer body. The top face of head 35 of the minute hand is covered with an opaque cap 37 which was omitted in FIGS. 2 and 3 in order to clarify the drawings.

Several reflectors 40 are distributed in head 29 of hour hand 11, around central hole 30 of the head. In the present case, these reflectors are eleven in number and are all located at substantially the same distance R1 from rotational axis 15. Likewise, several reflectors 41 are distributed in head 35 of minute hand 12. In the present case, reflectors 41 are nine in number and are located at substantially at the same distance R2 from axis 15. This distance R2 is smaller than R1, so that each reflector 41 can still receive a part of the axial light flux from light guide 18 through hour hand 11, without any risk of being entirely in the shadow of one of reflectors 40 of the hand. This risk is also avoided by the fact that the number and distribution of the reflectors is different from one hand to the other. Each of reflectors 40 and 41 is preferably formed by an oblique surface of a dihedron or V-shaped hollow 43 (FIG. 6) arranged in the transparent head of each hand, one of the faces of the dihedron forming the oblique reflector and the other face 44 of the dihedron being substantially vertical, i.e. parallel to rotational axis 15, so as to intercept the axial light flux as little as possible. The other faces 45 of each hollow 43 are also vertical for the same reason.

In the example shown, the transparent part forming the body 28, 34 and the head 29, 35 of each hand is flat, so that the thickness of the head is the same as that of the body of the hand. Reflectors 40 and 41 can extend through the entire thickness of this part and are inclined at approximately 45° with respect to axis 15 and the light beam, to reflect the light from the latter towards the interior of each hand. In the plan views of FIGS. 2 and 5, it can be seen that reflectors 40 and 41 generally have different orientations, on the one hand to distribute the reflected light into the body of the hand and, on the other hand so that as much as possible of the light reflected by the reflectors furthest from the body passes between the reflectors located closer to the body. This is why the latter reflectors are more spaced out than the reflectors furthest from the body. Moreover, the reflectors furthest from the body are oriented so as to avoid reflecting light towards central hole 30, 36 of the head. An opaque, preferably reflective coating is applied to the peripheral surface 46, 47 of each hand head 29, 35 to prevent light escaping towards the exterior at this location.

It will be noted that a hand such as that described here can also be made of cut polished glass.

Owing to the approximately 45° inclination of the reflectors, any light rays reaching a reflector from below in a substantially parallel direction to axis 15, undergoes a total internal reflection, provided that the refractive index of the transparent material is greater than $\sqrt{2}$, which is the case of PMMA, various types of glass and other transparent materials able to be used to make such hands. The total internal reflection allows more light energy to be led towards the body of the hand than could be achieved with metal reflectors. Light guide 18 can also be made of one of the aforementioned materials.

The three light-emitting diodes 23 are of small size and thus almost punctual Each of them emits light with a great predominance in the axial direction, i.e. parallel to axis 15. A part of the light that is not parallel to the axis can be reflected by total reflection inside guide 18 by the cylindrical faces of the latter. A reflective coating can be applied onto the lower part of the lateral surfaces of the guide, where the incident rays are to oblique to satisfy the total internal reflection condition. However, the intensity of the light leaving the upper surface of the guide in the direction of the hands is not uniform over the entire contour of the beam. The distribution of reflectors 40 and 41, as shown in FIGS. 2 to 5, is chosen such that the part of the light reflected into each hand varies relatively little during rotation of the hand. This distribution thus depends upon the number of diodes forming light source 21.

Since light guide 18 is fixed with respect to diodes 23, it is possible to give it an optical configuration tending to produce an optimum light beam at its output, either to make the luminous intensity uniform over the contour of the beam, or so that most of the light rays have an axial direction when they leave the guide. For example, the lower face of the guide can have, facing each diode, a shape producing a lens effect, particularly in the form of Fresnel lenses. Similar arrangements can be provided on the upper face of the guide.

It will be noted that it is in the top hand, here minute hand 12, that reflectors 41 are closest to axis 15, whereas reflectors 40 of the other hand are furthest from the axis. There are two reasons for this. First, hole 30 of bottom hand 11 is larger and thus it would be difficult for the reflected light to go around it if reflectors 40 were close to it. Secondly, since the intensity of the light in the axial beam is a little larger close to the interior, it is better to use this part of the beam to illuminate the top hand, given the dispersion and loss of light in the head of the bottom hand.

With such an arrangement, digital simulations have shown that it is possible to obtain excellent illumination intensity uniformity of each hand body during rotation, as well as good luminous output, this output being defined as the ratio between the light power passing through a cross section at the base of body 28, 34 of one of the two hands and the total luminous power of source 21. Output values of the order of 3.8% to 4.5% have been calculated with the arrangement shown, whereas the outputs obtained with reflectors located only opposite the body of the hand are close to only 2%.

In order to make clearly visible the position of each hand by means of the light thus reflected towards the interior of the transparent body of the hand, an advantageous solution consists in arranging light-diffusing surfaces at appropriate places, in particular on the lower face of the body. In the prior art, it was proposed to make such light-diffusing surfaces with a ground or granular surface structure of the transparent material. With the low light power available in the device described here, this embodiment of light-diffusing surfaces is not optimum, since the illumination of the surfaces remains too feeble.

Figure 5:
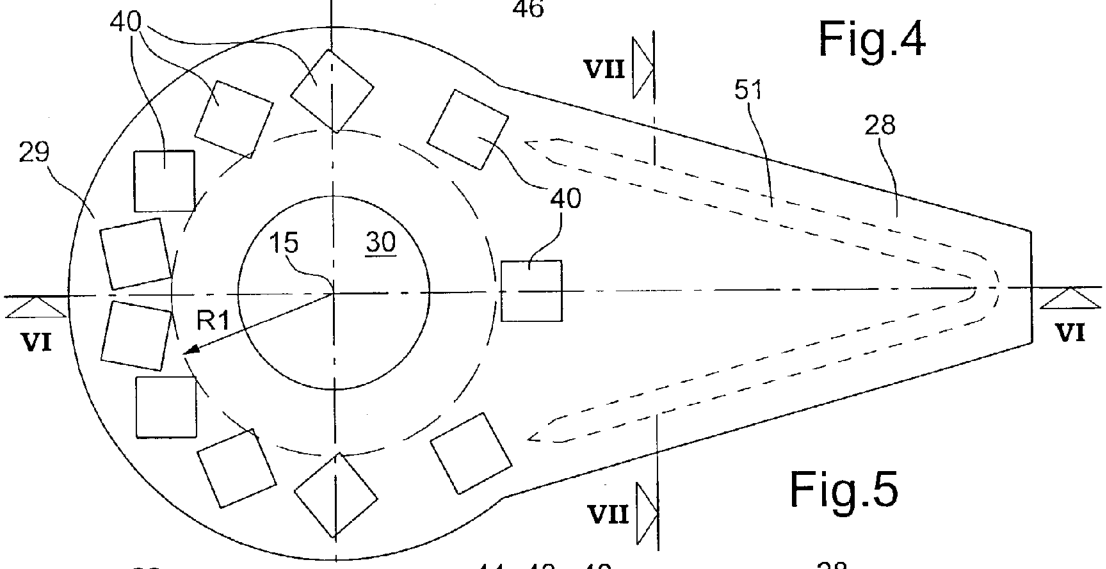
FIG. 5 shows in more detail the hour hand, seen from above.
Figure 6:
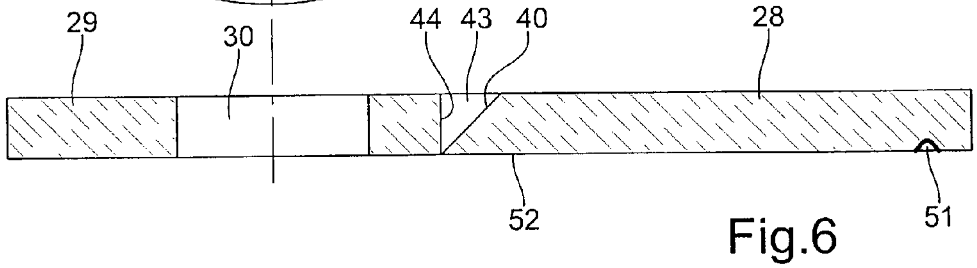
FIG. 6 is a cross-section along the line VI—VI of FIG. 5.
Figure 7:
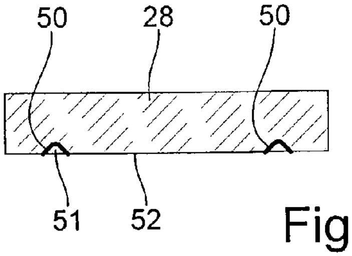
FIG. 7 is a cross-section along the line VII—VII of FIG. 5.

A more efficient solution consists in making the body of the hand visible by means of one or more light-diffusing surfaces which are preferably inclined with respect to the general plane of the body, in order to receive light directly from the reflectors, and are covered with a white or coloured paint, or a fluorescent paint. The painted zones further facilitate daytime visibility of the hand. FIGS. 5 to 7 show an example arrangement of such light-diffusing surfaces 50 which are formed by the inclined flanks of a groove 51 arranged in the lower face 52 of body 28 of the hour hand. Groove 51 can be formed during moulding of the transparent part. Its contour preferably follows the external contour of body 28 so that the observer can see substantially the same shape of the hand during the day and at night. Moreover, this arrangement allows opaque structural or decorative elements to be placed in the median zone of the body of the hand. The paint can be applied simply in one coat, as is shown by a bold line in the drawings, or fill the entire groove. The other hand will be provided with a similar groove, but with a different contour.

Figure 8:
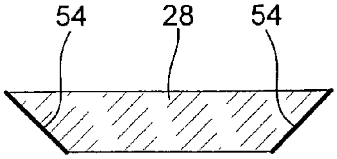
FIG. 8 is a similar view to FIG. 7 and shows an alternative embodiment.

In the variant shown in FIG. 8, light-diffusing surfaces 54 are formed directly by inclined flanks of the bottom face of body 28 of the hand.

The examples described hereinbefore can be subject to multiple modifications or variants without departing from the scope of the invention, as defined by the annexed claims. In particular, the number of luminous hands is not limited to two. For example, in a watch having a centre seconds hand, the latter can also be luminous and made in accordance with the principles explained hereinbefore, so that the same axial light beam illuminates the three coaxial hands. In another embodiment of the display device illustrated by FIG. 1, a non-luminous central second hand could be added, carried by an shaft that passes through bush 32 and cover 37 of minute hand 12. Of course, a hand made in accordance with the principles of the present invention can also be used as a single hand of any indicator or pointer, for example on the dashboard of an automobile.

The plurality of reflectors distributed in the head of a hand according to the invention can also include reflectors disposed along the peripheral surface of the head of the hand with an inclination close to 45°. In this case, this peripheral surface will preferably have a serrated shape, so that the reflectors direct the reflected light towards the body of the hand.

Instead of being flat, the body of the hand can have a variable thickness, for example owing to a lower face which rises in the direction of the tip of the hand and which reflects the incident rays upwards. This longitudinally inclined face can also include light-diffusing surfaces.

Given that a thin hand body made of synthetic material is relatively deformable, particularly by the effects of heat, it can be made rigid by means of external or internal metal elements, for example a radial bar bonded to the central bush.

Instead of being formed by the three light-emitting diodes 23 described hereinafter, light source 21 can take other forms. Light sources of elongated or even annular shape can, in particular, be used, to assure better uniformity of the luminous intensity around the axis.

According to a variant that is not shown, dial support 16 could be made of transparent material and combined with guide 18 in order to lead a part of the light from source 21 underneath the dial to make certain openings in the dial and/or time markings disposed thereon luminous.

Figure 1:
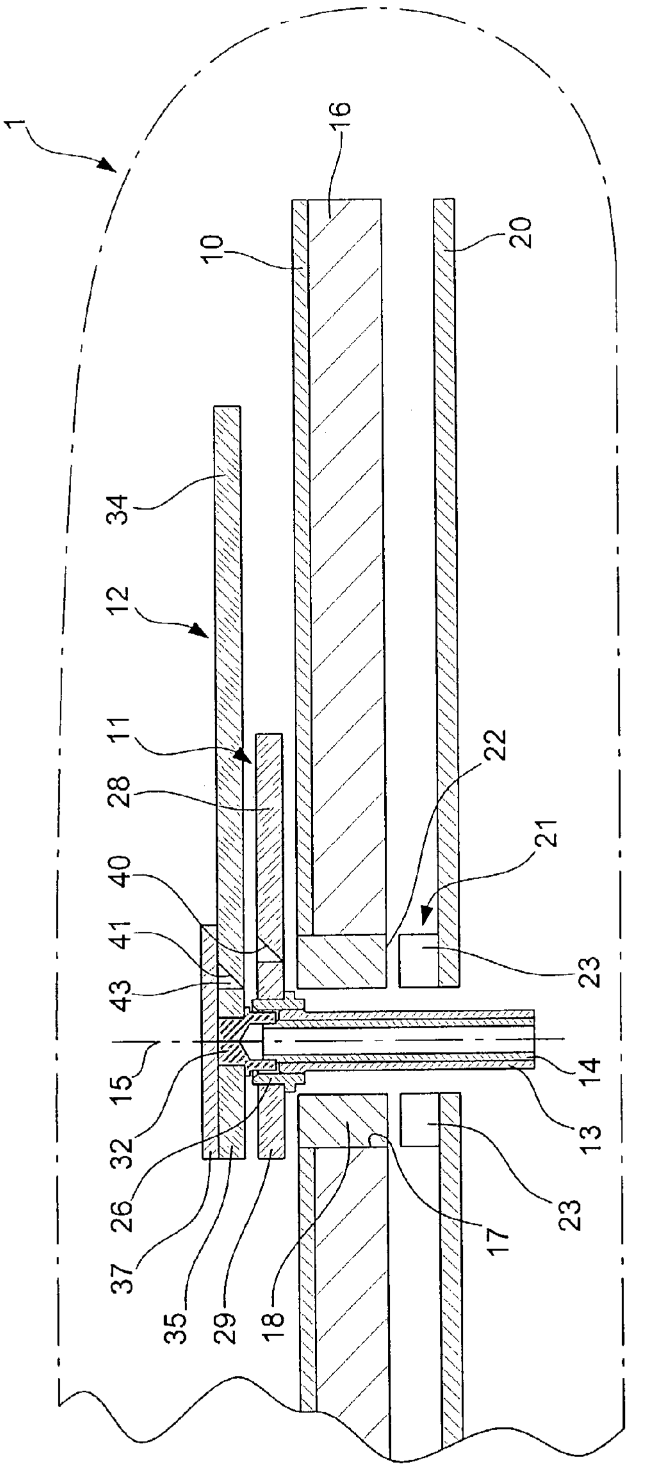
FIG. 1 is a schematic view in vertical cross-section of an analogue time display device by means of luminous hands according to the invention in a watch.

According to another variant, annular light guide 18 could be rotating and secured to the transparent part of the closest hand, in this case hour hand 11 in the example of FIG. 1, in order to avoid losing light between these two elements.

However, manufacturing this part would be more expensive than manufacturing a flat hand.

What is claimed is:

1. A display device with luminous hands for a timepiece, including:

a dial;

a pair of lower and upper hands, each disposed above the dial and each including a part made of transparent material which forms a circular head and an elongated body of the hand, outside the circular head, the respective circular heads of said hands being superposed and fixed to respective shafts to rotate about a common rotational axis upon which said circular heads are centered; and a stationary light source arranged to illuminate said heads of the hands from below by means of an axial light flux substantially parallel to the rotational axis;

wherein said head of each of the hands includes a plurality of reflectors distributed in said head and arranged to reflect a part of said axial light flux towards said elongated body of the hand, and wherein the transparent part forming the body and the head of each hand is flat, so that the thickness of the head is the same as that of the body of the hand.

2. The device according to claim 1, wherein the reflectors are distributed in the head of the hand not only in proximity to the elongated body of the hand, but also in portions of the head located at a distance from the body.

3. The device according to claim 1, wherein at least certain of the reflectors have different respective orientations.

4. The device according to claim 1, wherein the reflectors are arranged to produce a total internal reflection of the light rays substantially parallel to said axis.

5. The device according to claim 1, wherein said reflectors of the lower hand are spaced from each other.

6. The device according to claim 1, wherein, in each of said hands, the reflectors are located at substantially the same distance from the rotational axis, said distance being different from one hand to the other.

7. The device according to claim 1, wherein the light source includes light-emitting diodes which are distributed around said shafts and mounted on a printed circuit element disposed below the dial.

8. The device according to claim 1, wherein a light guide formed by a wall of a tube made of transparent material is disposed between the light source and the hand heads, said tube being fixed in a central aperture of the dial.

9. The device according to claim 5, wherein each reflector is formed by an oblique surface of a hollow arranged in the part made of transparent material.

10. The device according to claim 7, wherein the number of said reflectors in each of said hands is greater than the number of said light-emitting diodes.

11. A watch including a display device with luminous hands, including:

a dial;

a pair of lower and upper hands, each disposed above the dial and each including a part made of transparent material which forms a circular head and an elongated body of the hand, outside the circular head, the respective circular heads of said hands being superposed and fixed to respective shafts to rotate about a common rotational axis upon which said circular heads are centered; and a stationary light source including a plurality of light-emitting diodes arranged to illuminate said heads of the hands from below by means of an axial light flux substantially parallel to the rotational axis;

wherein said head of the lower hand includes a plurality of reflectors distributed in said head and arranged to reflect a part of said axial light flux towards said elongated body of the hand, said reflectors being spaced from each other, and wherein the transparent part forming the body and the head of each hand is flat, so that the thickness of the head is the same as that of the body of the hand.

12. The watch according to claim 11, wherein the number of said reflectors is greater that the number of said light-emitting diodes.

13. The watch according to claim 11, wherein the reflectors are distributed in the head of the hand not only in proximity to the elongated body of the hand, but also in portions of the head located at a distance from the body.

14. The watch according to claim 11, wherein at least certain of the reflectors have different respective orientations.

15. The watch according to claim 11, wherein the reflectors are arranged to produce a total internal reflection of the light rays substantially parallel to said axis.

16. The watch according to claim 11, wherein each reflectors is formed by an oblique surface of a hollow arranged in the part made of transparent material.

17. The watch according to claim 11, wherein a light guide formed by a wall of a tube made of transparent material is disposed between the light source and the hand heads, said tube being fixed in a central aperture of the dial.

18. The watch according to claim 11, wherein said head of the upper hand includes a plurality of reflectors distributed in said head and arranged to reflect a part of said light flux towards said elongated body of the hand.

* * * * *